United States Patent [19]

Bryan et al.

[11] 4,213,423
[45] Jul. 22, 1980

[54] POWDER DISPENSER

[76] Inventors: Henry A. Bryan, 8142 Ridgefield Dr., Huntington Beach, Calif. 92646; Walter H. Martin, 9902 Cleverdale Ave., Westminster, Calif. 92683; Richard L. Konves, 1193 Dorset La., Costa Mesa, Calif. 92626

[21] Appl. No.: 901,463

[22] Filed: May 1, 1978

[51] Int. Cl.³ .................. A01K 13/00; A45D 24/22
[52] U.S. Cl. .................................. 119/86; 119/159; 132/113
[58] Field of Search ................ 119/159, 86, 83; 132/112, 113, 114

[56] References Cited

U.S. PATENT DOCUMENTS

| 1,858,613 | 5/1932 | Bender | 132/113 |
| 2,376,065 | 5/1945 | Kuszyk | 132/114 |
| 2,626,617 | 1/1953 | Sullivan | 119/159 X |
| 2,794,443 | 6/1957 | Moore | 132/113 |
| 4,121,602 | 10/1978 | Young | 132/113 |

Primary Examiner—Hugh R. Chamblee
Attorney, Agent, or Firm—William C. Babcock

[57] ABSTRACT

A powder dispensing brush for use in dispensing medicated powders or flea control powder onto the body of a pet comprises a hollow elongate handle provided with an end opening closed by a snap-lock closure through which the powder is inserted into the handle interior. The handle itself is formed to provide a grasping surface over one longitudinal segment thereof and an applicator segment on the remainder of its structure. Formed on one lateral surface of the applicator segment are a plurality of conical projections each provided with a central vertical port communicating with the interior cavity of the handle. It is through these ports that powder deposited in the handle is dispensed onto the skin of the animal. In order to control the flow rate of the powder there is further included inside the handle a sliding plate provided with a plurality of openings disposed to align, along one point of the sliding stroke with the ports in the projection. This plate may be translated by way of a thumb button extending to the exterior of the handle segment or the grasping segment, thus controlling the rate of powder dispensed.

3 Claims, 5 Drawing Figures

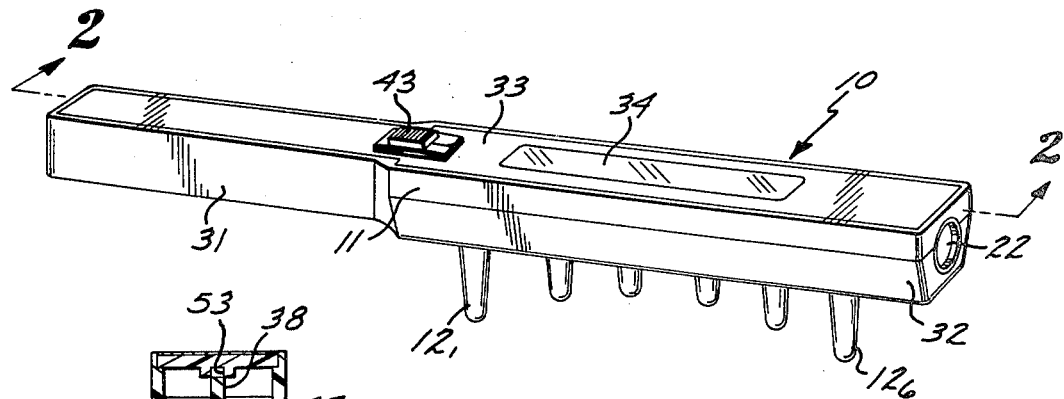
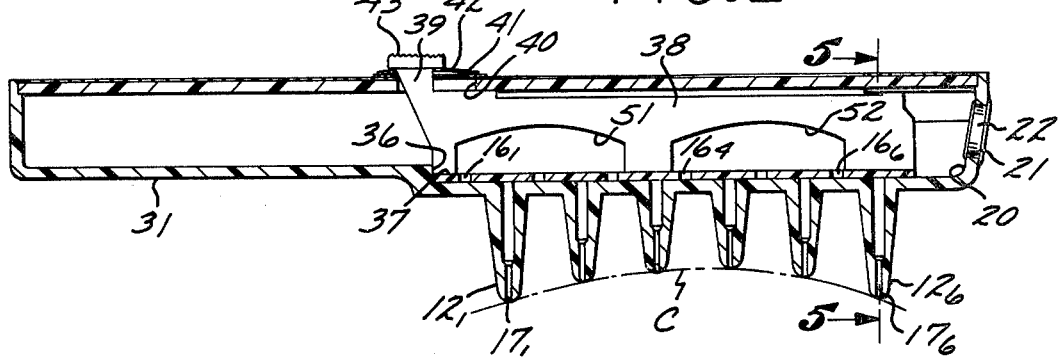
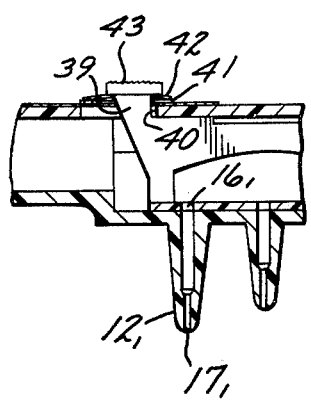
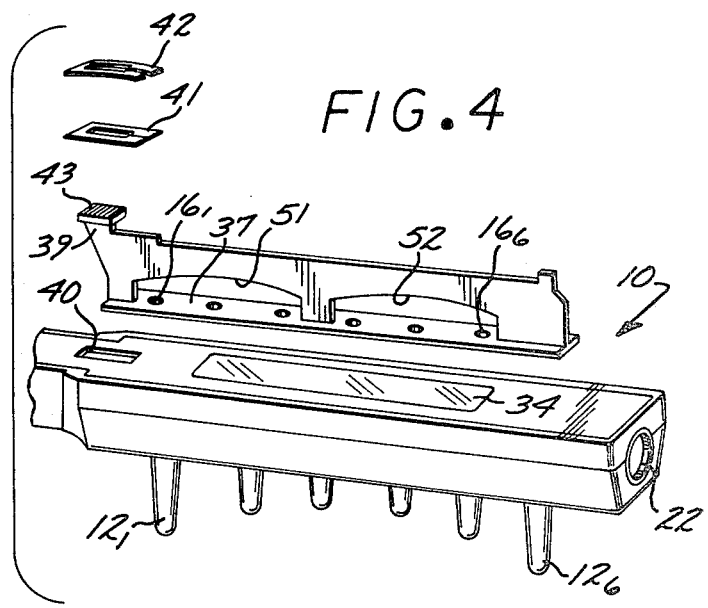

POWDER DISPENSER

BACKGROUND OF THE INVENTION

1. Field of the Invention

The present invention relates to powder dispensing devices, and more particularly to devices for inserting powder onto the skin of any animal covered by hair.

2. Description of the Prior Art

Dispensing of powder onto an animal covered by hair has been known in the past. Most frequently dispensing devices adapted for this use were conformed as brushes having disposed between the brush hairs openings through which the powder or other lotion was dispensed. The disadvantage sometimes entailed in structures of the foregoing kind is that the powder, as it is dispensed, falls on the exterior segment of the hair and thus does not penetrate to make contact with the skin below. Alternatively, devices have been provided in the past where hollow projections were included in interspaced arrangements with the hairs forming the brush. Once more, while suited for their intended use, these devices have a tendency of wiping the powder off during the stroke, thus resulting in an uneven application. Furthermore, in order to reduce the imprint or strength of contact between the nozzle ports and the skin most of the prior art devices of the latter kind entailed the use of shortened nozzles extending only partly into the brush filaments, thus resulting in deposits of the material dispensed at a point above the root of the hairs. Furthermore these foregoing devices included stiff dispensing nozzles of uniform width which because of structural requirements would present rigid edges at the end thus making any contact uncomfortable. In addition blunt dispensers of this kind were insufficient in their ability to penetrate the hair, thus tending to smooth the hair down rather than to separate it.

SUMMARY OF THE INVENTION

Accordingly, it is the general purpose and object of the present invention to provide a powder dispenser conformed in the manner of a brush handle, hollow on the interior thereof, said brush handle being provided with a plurality of conical ported nozzles or projections semi-flexible proximate the free ends thereof.

Other objects of the invention are to provide a hollow brush dispensing device which includes means for adjustment of the dispensing rate therethrough.

Yet additional objects of the invention are to provide a powder dispenser conformed as a brush having a plurality of penetrating nozzles arranged in a row.

Yet further objects of the invention are to provide a brush dispenser having a plurality of nozzles, each nozzle terminating along an arc to conform with the body convolutions of an animal.

Briefly these and other objects are accomplished within the present invention by providing a hollow, elongate handle structure having a grasping segment and an applicator segment, where the applicator segment is provided with one longitudinal surface on which a row of conical projecting nozzles is formed. Each nozzle, furthermore, includes a central port extending partly therethrough and communicating with a reduced section opening proximate the tip of apex, to form a relatively flexible apex. On the interior of the handle structure there is provided a sliding plate including a plurality of openings dimensioned to coincide with the interior openings of the foregoing bores, the sliding plate being attached to a tab extending to the exterior of the handle structure for manipulation by the user. In addition the handle structure includes an end opening through which powder to be dispensed is inserted or loaded and a translucent viewing aperture for determining the amount of powder remaining.

It is contemplated to form the foregoing structure out of a material like plastic which, because of its flexibility, will render the tips of the foregoing conical nozzle flexible. Furthermore, in order to reduce the contact and to distribute the application force, the conical projections extend in length along a segment of an arc and thus shall conform to the various undulations in the body of an animal by appropriate inclination of the handle.

BRIEF DESCRIPTION OF THE DRAWINGS

FIG. 1 is a perspective illustration of an improved powder dispensing device constructed according to the present invention;

FIG. 2 is a side view, in section, of the inventive dispenser shown in FIG. 1;

FIG. 3 is a detail view, once more, in section, illustrating the translation of an orifice control plate on the interior thereof;

FIG. 4 is an assembly drawing illustrating the various parts useful in the present invention; and FIG. 5 is an end view, in section, taken along the line 4-4 of FIG. 2.

DESCRIPTION OF THE SPECIFIC EMBODIMENT

As shown in FIGS. 1 and 2, the inventive powder dispenser, generally designated by the numeral 10, comprises an elongate handle 11 provided with a plurality of conical nozzles $12_1$-$12_6$ arranged in a row to extend normally from one lateral surface thereof. Each nozzle $12_1$-$12_6$ is conformed in a manner of a conical segment having the wider base thereof attached to the surface of the handle 11, the narrower end extending distally from the handle for insertion between the hairs of an animal. In order to conform to the various undulations in the body of an animal the ends of nozzle $12_1$-$12_6$ are arranged along a segment of a circle C and will therefore align with practically any body surface by selective angulation of the device 10 itself.

As shown in FIGS. 2, 3 and 4 each of the nozzles $12_1$-$12_6$ includes an enlarged bore $15_1$-$15_6$ extending partly therethrough and communicating with the interior cavity 20 formed within handle 11. It is within this cavity 20 that powder P is stored, such powder being loaded into the handle structure 11 by way of an end opening 21 closed by a snap-lock closure 22. The handle structure 11 furthermore comprises a grasping segment 31 arranged in line with a dispensing segment 32, segments 31 and 32 being closed by a cover plate 33 including the aforementioned opening 21. Cover 33 furthermore includes a translucent aperture 34 aligned to coincide with the dispensing segment and it is through this aperture that viewing can be had into the interior of cavity 20. At the juncture of segment 31 and segment 32, the interior cavity 20 forms a shoulder 36 and it is between this shoulder 36 and the end of the cavity that a sliding plate 37 is retained. More specifically, plate 37 is aligned to slide across the interior openings of bore $15_1$-$15_6$ plate 37 including a plurality of openings $16_1$-$16_6$ dimensioned to align with the foregoing bores at one limit of its stroke. Plate 37 is connected to a spine member 38 extending vertically therefrom and dimensioned to slide between the interior limits of cavity 20 and shoulder 36. Spine 38 terminates in a tab 39 extending through an elongate opening 40 formed in the cover plate 33 for manipulation. To preclude unwanted leakage of the powder from the cavity 20 through opening 40, there is further provided a sliding seal 41 surrounding tab 39, seal 41 being biased or urged thereto by way of a convex spring 42 compressed by a finger button 43 on the free end of the tab.

As has been stated above, each of the nozzles $12_1-12_6$ are formed as segments of cones, each nozzle including the aforementioned enlarged bore $15_1-15_6$ extending into the cavity 20. Proximate the tip, each nozzle further includes a reduced diameter bore $17_1-17_6$ that the powder P contained in the handle is dispensed. More specifically, as shown in FIG. 2, the undulations of the animal skin surface are set out along curves C, each end of the cones $12_1-12_6$ making contact therewith. By proper selection of material structure and the rim thickness of the ends of each nozzle, it is possible to provide a relatively flexible contact point precluding injury to the animal.

For the purposes herein it is contemplated to fabricate both the handle structure 11 and the nozzle $12_1-12_6$ extending therefrom from a plastic material structure formed as a single integral molded part. The cover plate 33 is then received to close cavity 20 and may be made of clear plastic. The tapered configuration of each nozzle together with the relatively thin end segments thereof provides for convenience in separating the hairs on the body of the animal, thus insuring direct skin application rather than application over matted hair. While various longitudinal alignments of nozzles $12_1-12_6$ are possible, the preferred alignment, as shown in FIG. 5, is along a symmetrical plane through the longitudinal symmetry of handle 11. Accordingly, ports $15_1-15_6$ and $17_1-17_6$ will extend along this plane of symmetry dictating the position of openings $16_1-16_6$ in the plate 37 to a central alignment. In order to accommodate this geometry the spine member 38 is cut out in cutouts 51 and 52 proximate the upper surface of the plate. Thus spine member 38 attaches by way of several finger-like projections to the foregoing plate there being formed on each end of the upper edge thereof opposing shoulders for retaining the spine in a groove 53 formed in interior base of handle housing.

The foregoing combination of parts and the manner of forming same results in a powder dispenser which is uniquely suited for use with animals having long or stiff fur. In addition, by manipulative selection of the position of tab 39 within slot 40 it is possible to adjust various flow rates through bores $15_1-15_6$. By further manipulation as shown in FIGS. 2 and 3 either a full closure or a full opening can be formed thus providing the convenience of storage and at the same time the convenience of cleaning out of any accumulated residue.

Obviously many modifications and variations may be made to the above disclosure without departing from the spirit of the invention. It is therefore intended that the scope of the invention be determined by the claims.

What is claimed is:

1. A powder dispenser for use in applying powder by gravity onto the skin of a furry animal as the dispenser is transversely disposed to the animal and moved longitudinally relative to the animal, said powder dispenser comprising:
   a. an elongate hollow body that includes a top and a bottom, said body including a powder dispensing segment and a handle segment that are coaxially aligned;
   b. a plurality of longitudinally spaced conical nozzles of varying lengths that project downwardly from said bottom of said dispensing segment, said nozzles having bores extending therethrough that communicate with the interior of said dispensing segment, said nozzles of such length that the free ends thereof are aligned in an arcuate configuration that conforms generally to the transverse convex configuration of said animal's back, both said dispensing segment and handle capable of having said powder stored therein;
   c. an elongate plate situated in said dispensing segment and slidably supported on said bottom thereof, said plate having a plurality of longitudinally spaced openings therein that are axially aligned with said bores in said nozzles when said plate is moved from a first to a second position in said dispensing section, with powder in said dispensing section falling by gravity through said openings and bores to be dispensed onto the fur of said animal when said plate is in said second position and said body is moved longitudinally relative to the body of said animal;
   d. articulating means connected to said plate and extending to the exterior of said body for moving said plate to either said first or second position, said openings and bores being out of communication when said plate is in said first position, and said powder being maintained within said body, said articulating means including:
      1. an elongate spline secured to said plate and extending upwardly therefrom;
      2. a tab secured to said spline, said tab extending upwardly through an elongate slot in said top; and
      3. sealing means operatively associated with said tab and slot to prevent powder being discharged from the interior of said body through said slot;
   e. a cover removably secured to said dispensing section of said body, said cover when mounted on said dispensing section forming a part of said top, and said cover when removed allowing the interior of said hollow body to be filled with said powder.

2. A powder dispenser as defined in claim 1 which in addition includes:
   f. means in said dispenser to visually determine the amount of powder within said body from the exterior thereof.

3. A powder dispenser as defined in claim 2 in which said means is a window in said cover.

* * * * *